United States Patent [19]
Bodnar

[11] Patent Number: 6,012,063
[45] Date of Patent: Jan. 4, 2000

[54] BLOCK FILE SYSTEM FOR MINIMAL INCREMENTAL DATA TRANSFER BETWEEN COMPUTING DEVICES

[75] Inventor: Eric O. Bodnar, Capitola, Calif.

[73] Assignee: Starfish Software, Inc., Scotts Valley, Calif.

[21] Appl. No.: 09/034,644

[22] Filed: Mar. 4, 1998

[51] Int. Cl.[7] .................................................. G06F 12/04
[52] U.S. Cl. ...................... 707/101; 707/100; 707/200; 707/205; 711/153; 711/171; 711/209
[58] Field of Search .................................. 707/100, 101, 707/200, 205; 711/209, 171, 153

[56] References Cited

U.S. PATENT DOCUMENTS

| | | | |
|---|---|---|---|
| 4,435,752 | 3/1984 | Winkelman | 707/205 |
| 4,653,112 | 3/1987 | Ouimette | 382/69 |
| 4,686,332 | 8/1987 | Greanias et al. | 178/19 |
| 4,774,655 | 9/1988 | Kollin et al. | 364/200 |
| 5,007,085 | 4/1991 | Greanias et al. | 380/25 |
| 5,121,396 | 6/1992 | Irvin et al. | 714/807 |
| 5,175,854 | 12/1992 | Cheung et al. | 395/650 |
| 5,179,701 | 1/1993 | Chisholm | 707/104 |
| 5,224,060 | 6/1993 | Ma | 364/708 |
| 5,309,564 | 5/1994 | Bradley et al. | 395/200 |
| 5,313,578 | 5/1994 | Handorf | 395/200 |
| 5,329,619 | 7/1994 | Page et al. | 395/200 |
| 5,471,615 | 11/1995 | Amatsu et al. | 395/200 |
| 5,479,656 | 12/1995 | Rawlings, III | 707/200 |
| 5,519,851 | 5/1996 | Bender et al. | 395/500 |
| 5,561,446 | 10/1996 | Montlick | 345/173 |
| 5,577,177 | 11/1996 | Collins et al. | 395/169 |
| 5,579,481 | 11/1996 | Drerup | 395/200 |
| 5,583,978 | 12/1996 | Collins et al. | 395/170 |
| 5,592,657 | 1/1997 | Johnson et al. | 395/200 |
| 5,592,665 | 1/1997 | Lahaije | 707/4 |
| 5,625,819 | 4/1997 | Hoffer, Jr. | 707/202 |
| 5,630,168 | 5/1997 | Rosebrugh et al. | 395/825 |
| 5,652,864 | 7/1997 | Hine | 711/171 |
| 5,832,310 | 11/1998 | Morrissey et al. | 710/71 |
| 5,835,959 | 11/1998 | McCool et al. | 711/171 |
| 5,845,282 | 12/1998 | Alley et al. | 707/10 |
| 5,850,565 | 12/1998 | Wightman | 315/821 |
| 5,864,867 | 1/1999 | Krusche et al. | 707/104 |

*Primary Examiner*—Jean R. Homere
*Attorney, Agent, or Firm*—John A. Smart

[57] ABSTRACT

A portable computing device is described with a file system designed for providing improved data transfer methodology. The file system is implemented as a "Delta Block" File System (DBFS) comprising a file system designed specifically for the purpose of minimal delta calculation and minimum data transfer, particularly for portable storage devices which use solid state storage. The design of the DBFS minimizes the work required to compute changes to files and, hence, allows improved data transfer. Any new, removed, or modified blocks are transferred as changes. A simple checksum, CRC (cyclic redundancy checking), or similar comparison can be used to test a block for changes. Because block modifications are isolated to the proximity of the data change, only these blocks will be involved in a transfer. Furthermore, because the delta calculation is at the block level, it can be performed without knowledge of the data itself, thereby allowing any type of data to be compared and transferred. By supporting minimal transfer of data, the file system solves the problem of disproportionate data storage and communication speed situations, such as those encountered with portable computing devices.

20 Claims, 5 Drawing Sheets

BLOCK FILE SYSTEM FOR MINIMAL INCREMENTAL DATA TRANSFER BETWEEN COMPUTING DEVICES

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the area of information processing and, specifically, to system and methods for storing information in one device, particularly a portable (e.g., hand-held) computing device, and transferring that information to another computing device.

With compact, portable computing devices becoming ever more popular because of advances in manufacturing and power consumption, there is an increasing desire to carry more and more personal information on such devices. Storage of increasing amounts of data on such devices is easily handled by increasing solid state storage capacity.

Because of form factor constraints, portable devices are often designed with minimal input capabilities, often making data entry cumbersome or even impossible. For this reason, portable computing devices are most effective as a component of a solution involving connectivity with larger, more input capable devices such as desktop computers, laptop computers and information servers.

The increase in data volume on portable devices, combined with the need to transfer data to and from other larger devices, presents a connectivity problem. In particular, connection speeds rarely match storage capacity and data size requirements. One method to assist data flow is data compression. Another, more effective method, which can be combined with compression, is to achieve minimal data transfer through "deltas" or differences between two data sets.

Typical file systems are designed for storage and retrieval of data, focusing on storing and retrieving large amounts of data on slow electro-mechanical devices. Such file systems typically store information in block chains represented in a specific storage area. The popular "FAT" storage system represents block chains in a designated area called the File Allocation Table. This mechanism is well suited for large capacity, mechanical storage devices because the allocation table, a table in constant use, can be cached in computer memory and accessed without typical mechanical penalties such as seek time and transfer time. This type of file system, however, is not suited for minimal data transfer. In particular, storage on a portable device is usually solid state (e.g., RAM or random-access memory), not mechanical. The issues with seek time and data transfer time are minimized—practically non-existent—with solid state storage technology. The issue of minimal data transfer remains, however.

What is needed is a file system structure designed for minimizing data transfer, rather than one designed for minimizing the access constraints of mechanical storage devices. The present invention fulfills this and other needs.

SUMMARY OF THE INVENTION

A portable computing device or "information appliance" is provided with a file system designed for transferring data to other computing devices. The portable computing device comprises a central processing unit (e.g., microprocessor) connected via a system bus to a display, an input, ports, and memory. The display is a screen device for displaying information, such as a liquid crystal display (LCD) screen. The input comprises a keypad, either physical or logical (e.g., on screen buttons), but is typically limited to a terse set numbering about three to ten buttons. The memory comprises persistent memory, volatile memory, and non-volatile RAM memory. The persistent memory is typically implemented as a ROM or read-only memory. It stores a single-purpose operating system (SPOS) and application(s). The volatile memory is a "scratch" memory, for storing temporary computation results. It typically is implemented as a RAM (random-access memory), for providing a work space for the operating system and applications. The non-volatile RAM memory represents battery-backed RAM memory or flash memory, for storing context information from one session to another. When the device is powered down, the memory stores user data for the last session.

The data transfer methodology of the device employs an improved file system supporting minimal transfer of data, thereby solving the problem of disproportionate data storage and communication speed situations, such as those encountered with portable computing devices. The file system is implemented as a "Delta Block" File System (DBFS) comprising a file system designed specifically for the purpose of minimal delta calculation and transfer for portable storage devices which use solid state storage. The design of the DBFS minimizes the work required to compute changes to files and, hence, allows improved data transfer. In the traditional file system, an insert may affect many blocks of the file, thus requiring the entire file to be transferred or requiring a complicated difference calculation to find how the file has been changed.

In accordance with the present invention, change or delta calculations are simplified in the DBFS as follows. Any new, removed, or modified blocks are transferred as changes. A simple checksum, CRC (cyclic redundancy checking), or similar comparison can be used to test a block for changes. Because block modifications are isolated to the proximity of the data change, only these blocks will be involved in a transfer. Furthermore, because the delta calculation is at the block level, it can be performed without knowledge of the data itself, thereby allowing any type of data to be compared and transferred.

In this manner, the Delta Block File System (DBFS) of the present invention provides an improved file system architecture for portable computing devices. By isolating typical file changes to a small area of the storage media or memory and by providing a highly-efficient, yet generic, method of detecting modifications, the present invention provides a greatly improved mechanism of transferring data between computing devices, such as when updating differences between data on a portable device and corresponding data on a host device.

DETAILED DESCRIPTION OF A PREFERRED EMBODIMENT

The following description will focus on the presently-preferred embodiment of the present invention, which is typically operative in a portable computing environment comprising hand-held devices with connectivity to larger devices (e.g., desktop computers). The present invention, however, is not limited to any particular one application or any particular environment. Instead, those skilled in the art will find that the system and methods of the present invention may be advantageously applied to a variety of systems and applications. Moreover, the present invention may be embodied on a variety of different platforms, including non-portable ones such as Windows, Macintosh, UNIX, NextStep, and the like. Therefore, the description of the exemplary embodiments which follows is for purposes of illustration and not limitation.

General System

A. Device hardware

Figure 1:
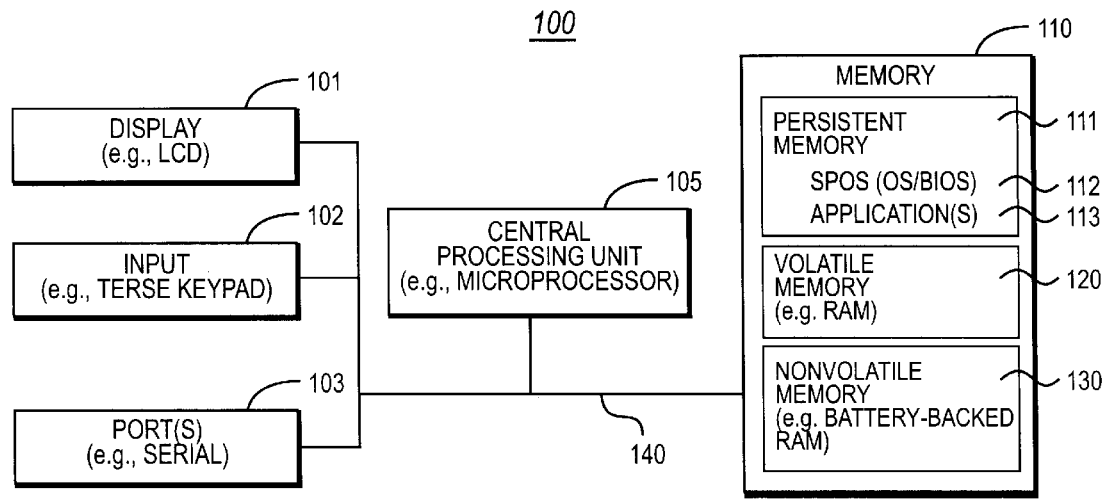
FIG. 1 is a block diagram illustrating the general architecture of a portable computing device or "information appliance" in which the present invention may be embodied.

FIG. 1 is a block diagram illustrating the general architecture of a portable computing device or "information appliance" in which the present invention may be embodied. As shown, computing device 100 comprises a central processing unit 105 (e.g., microprocessor) connected via a system bus 140 to a display 101, an input 102, ports 103, and memory 110. Display 101 is a screen device for displaying information, such as a liquid crystal display (LCD) screen. Input 102 comprises a keypad, either physical or logical (e.g., on screen buttons), but limited to a terse set numbering about three to ten buttons and more preferably about five buttons. Memory 10 comprises persistent memory 111, volatile memory 120, and non-volatile RAM memory 130. Persistent memory 111 is typically implemented as a ROM or read-only memory. As shown, it stores a single-purpose operating system (SPOS) 112 and application(s) 113, which are described in further detail below. Volatile memory 120 is a "scratch" memory, for storing temporary computation results. It typically is implemented as a RAM (random-access memory), for providing a work space for the operating system and applications. Non-volatile RAM memory 130 represents battery-backed RAM memory or flash memory, for storing context information from one session to another. When the device 100 is powered down, the memory 130 stores user data from that session.

B. Device Software

The single purpose operating system (SPOS) functions to provide a consistent mechanism by which applications 113 can communicate with the device 100. In this manner, applications 113 are shielded from hardware complexity, such as hardware interrupts and ports. In other words, it serves to abstract hardware complexity to a high-level application programming interface (API).

Figure 2:
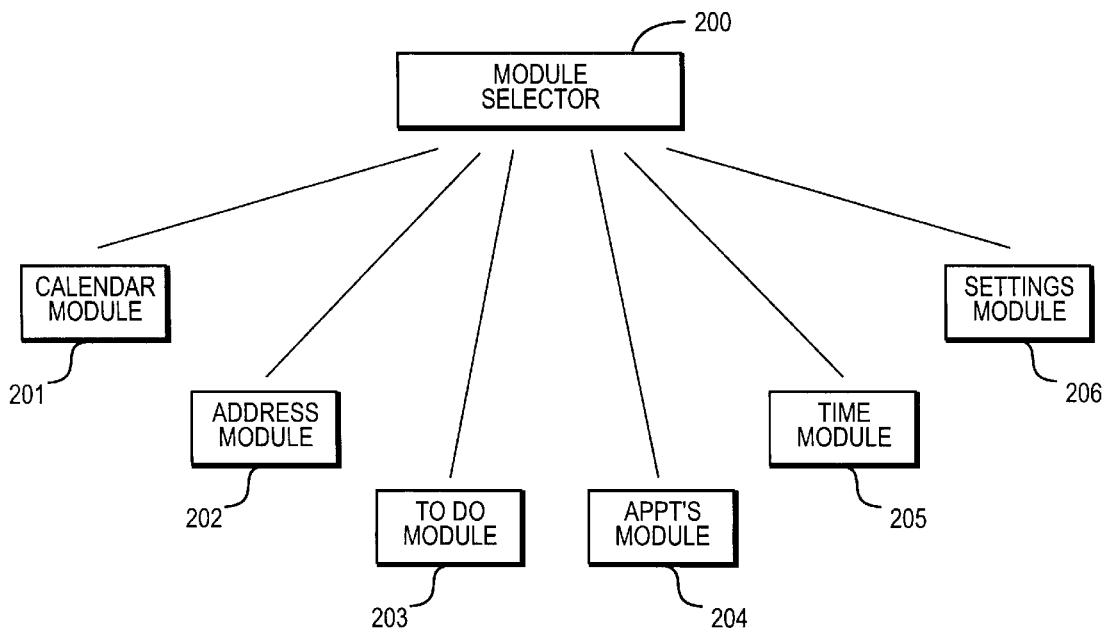
FIG. 2 is a block diagram illustrating implementation of the application programs as modules under the control of a module selector.

Applications 113 are software application programs or modules provided for user operation of the device. As shown in FIG. 2, for instance, the application programs can be implemented as modules 201–206, which are controlled by a module selector 200. The module selector 200 serves as a user interface or shell representing the top-level or "home" display presented to a user. In the currently-preferred embodiment, the module selector 200 presents the user with selection icons for navigating to different applications or modules of functionality. In an exemplary embodiment, for instance, other modules include a calendar module, a to do module, and an address book module.

In an exemplary embodiment, device 100 comprises a REX™ portable device, such as Model REX-3 available from Franklin Electronic Publishers of Burlington, N.J. Further description of the design and operation of the device 100 is provided in commonly-owned U.S. patent application Ser. No. 08/905,463, filed Aug. 4, 1997, and entitled, USER INTERFACE METHODOLOGY FOR MICROPROCESSOR DEVICE HAVING LIMITED USER INPUT, the disclosure of which is hereby incorporated by reference.

In typical use, the device 100 is used in tandem with a desktop computer or PC. The desktop PC is used by the user when "at the office," and the portable computing device 100 is employed when the user is "on the road" (i.e., out of the office). Thus during typical use, large repositories of data reside on the desktop PC which are periodically transferred or synchronized with data residing on the portable computing device 100. Multiple techniques exist for getting data from the desktop PC to the portable computing device, through device port(s) 103. Using a device input/output (I/O) protocol or standard, such as the PC card standard (formerly PCMCIA standard), the user can easily transfer data to the device 100 via a direct memory transfer. Alternatively, data can be streamed from the desktop PC to the portable computing device via a direct cable (or infrared) connection, such as using a serial port-to-serial port connection. Since the data transferred is that of an application operating on the desktop PC, potentially thousands of data items or records might be downloaded into the portable computing device 100. This potentially large data volume, coupled with the need to transfer data to and from other larger devices, poses a connectivity challenge, as connection speeds rarely match storage capacity and data size requirements. Therefore, improved data transfer methodology is desired.

"Delta Block" File System

A. General

In the most-preferred embodiment, the data transfer methodology of the present invention adopts an improved file system supporting minimal transfer of data, thereby solving the problem of disproportionate data storage and communication speed situations, such as those encountered with portable computing devices. A minimal transfer approach entails additional difficulties, however. The work required to calculate the differences or "deltas" is a primary concern. Delta calculation becomes increasingly challenging if the file system of the underlying computing device is designed to store varied types of data. Ideally, the file system should be designed for minimal transfer, thus allowing for simple delta calculation for any type of data.

B. File structure

The present invention provides a "Delta Block" File System (DBFS) comprising a file system designed specifically for the purpose of minimal delta calculation and transfer for portable storage devices which use solid state storage. The system employs block chains of variably sized records. The block chains themselves link together to build a continuous stream which can be manipulated with data access or file operations, including reads, writes, appends, inserts and deletes.

Figure 3:
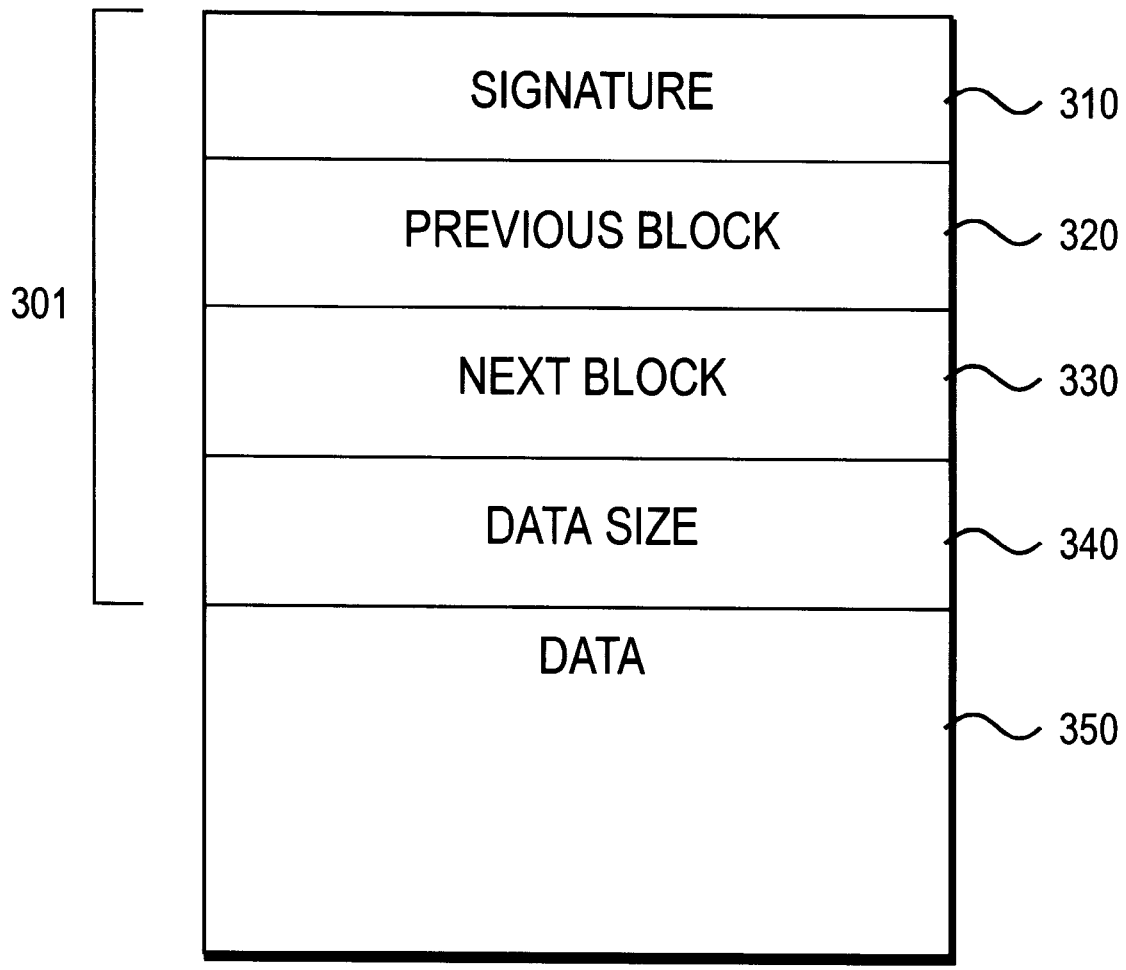
FIG. 3 illustrates a basic block structure employed by the file system of the present invention.

As illustrated in FIG. 3, a basic block structure 300 employed by the file system includes a header 301 comprising a signature section 310, a previous block section 320, a next block section 330, and a data size section 340. A data (storage) section 350 follows the header. These sections function as follows.

SIGNATURE—signature and flag bits representing the validity and state of the block (i.e., used, free, bad).

PREVIOUS BLOCK—index (i.e., pointer) to previous block in chain (special value indicates NONE).

NEXT BLOCK—index (i.e., pointer) to next block in chain (special value indicates NONE).

DATA SIZE—size of block data area (must be ≦size of block—size of header).

DATA—the data itself.

Thus as shown, the signature section 310 stores identification information or "signature," for identifying the validity of the block. The previous and next block sections 320, 330 specify the position of the block in a chain of blocks. The data size section 340 specifies the size of the data area of the block. In the currently-preferred embodiment, the size of each block on the media is physically equal. However, the actual data area within a block, stored at section 350, can vary from block to block.

Figure 4:
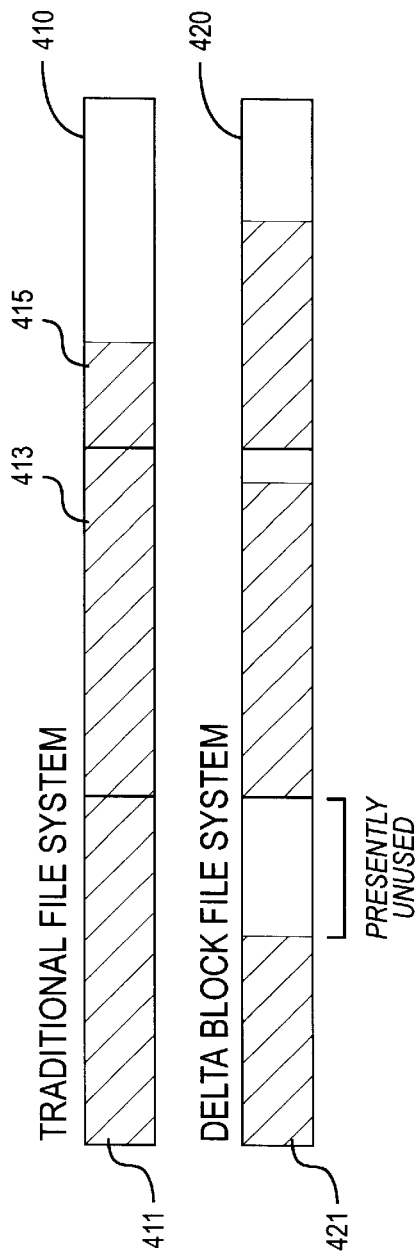
FIG. 4 is a block diagram illustrating the difference between a file in a traditional file system with that of a file in the file system of the present invention, with respect to how storage is allocated for allowing for growth.

FIG. 4 is a block diagram illustrating the difference between a file 410 in a traditional file system with that of a file 420 in the DBFS file system of the present invention. In a traditional file system, each block (e.g., block 411) is filled to capacity with data. Additional blocks (e.g., blocks 413, 415) are added as necessary, allowing for growth at the end of the file stream. In the delta block file system, in contrast, blocks may or may not be filled to capacity, as shown for instance by block 421, thus allowing room for growth within the file stream as well as at the end.

C. Minimizing File System Changes

The approach adopted by the DBFS is to minimize changes to the block chains in the file system which occur in response to typical file operations. Fewer changes to the file system result in less data begin transferred to another system. Table insert operations are a common operation on portable computing devices, because of the need to maintain sorted lists.

Figure 5:
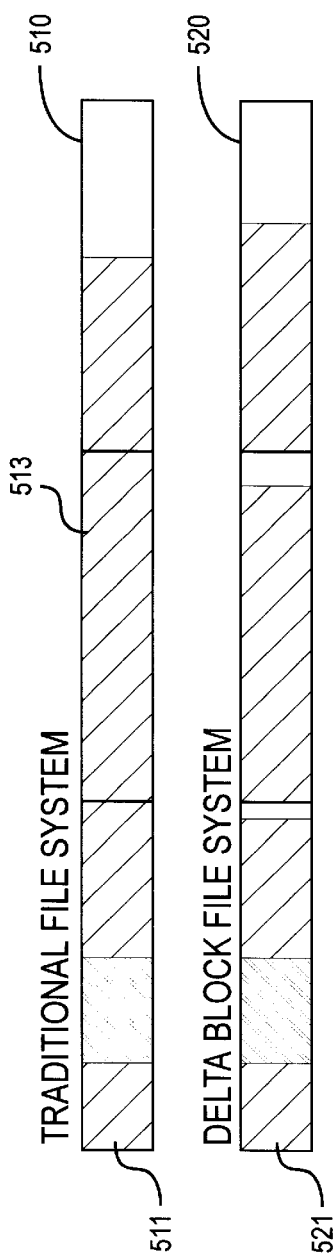
FIG. 5 is a block diagram illustrating the impact of a table insert into a file in a traditional file system and into a file in the file system of the present invention.

FIG. 5 is a block diagram illustrating the impact of a table insert into a file 510 in a traditional file system and into a file 520 in the DBFS of the present invention. An insert near the top (e.g., block 511) of the file 510 in the traditional file system forces data to be moved (i.e., "moved up"), thus causing updates to blocks in the file after the insert point (e.g., block 513). An insert near the top of a DBFS file (e.g., block 521) only grows the size of the data area within the affected block, thus leaving all following blocks untouched.

Figure 6:
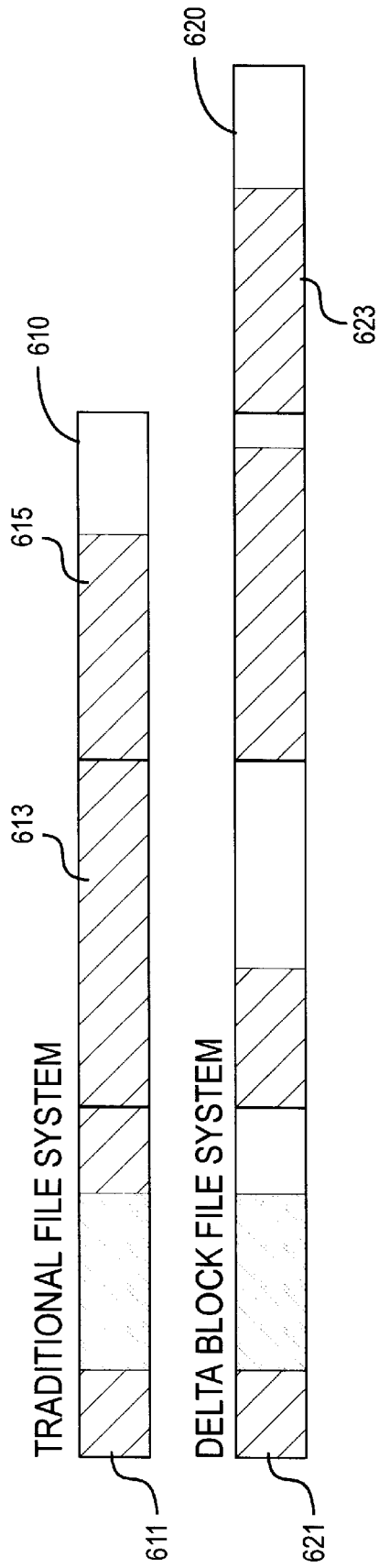
FIG. 6 is a block diagram illustrating a similar insert into a file in a traditional file system and into a file in the file system of the present invention, but with a larger amount of data.

FIG. 6 is a block diagram illustrating a similar insert but with a larger amount of data. As shown, the insert into block 611 again causes data in the file 610 of the traditional file system to move up through all blocks after the insert point (i.e., blocks 613, 615). The insert into the file 620 of the DBFS cannot fit within the space of the target block 621 so a new block 623 is introduced or allocated to take up the overflow. The result is impact to only two blocks in the chain.

D. Improved Data Transfer by Simplifying Delta Calculations

The design of the DBFS minimizes the work required to compute changes to files and, hence, allows improved data transfer. In the traditional file system, an insert may affect many blocks of the file, thus requiring the entire file to be transferred or requiring a complicated difference calculation to find how the file has been changed.

In accordance with the present invention, change or delta calculations are simplified in the DBFS as follows. Any new, removed, or modified blocks are transferred as changes. A simple checksum, CRC (cyclic redundancy checking), or similar comparison can be used to test a block for changes (e.g., by comparing against a prior checksum for that block). A simple checksum, for instance, can be constructed by simply adding all the units together which comprise the content of interest, such as adding together all of the byte values for the block. The approach allows the summation process to overflow or wrap around as necessary, thus yielding an end result or sum that is typically a machine word (or other convenient unit). If desired, the checksum or CRC value itself can be stored as an element of the block header for convenience. Because block modifications are isolated to the proximity of the data change, only these blocks will be involved in a transfer. Furthermore, because the delta calculation is at the block level, it can be performed without knowledge of the data itself, thereby allowing any type of data to be compared and transferred.

E. Summary of Overall Methodology

Figure 7:
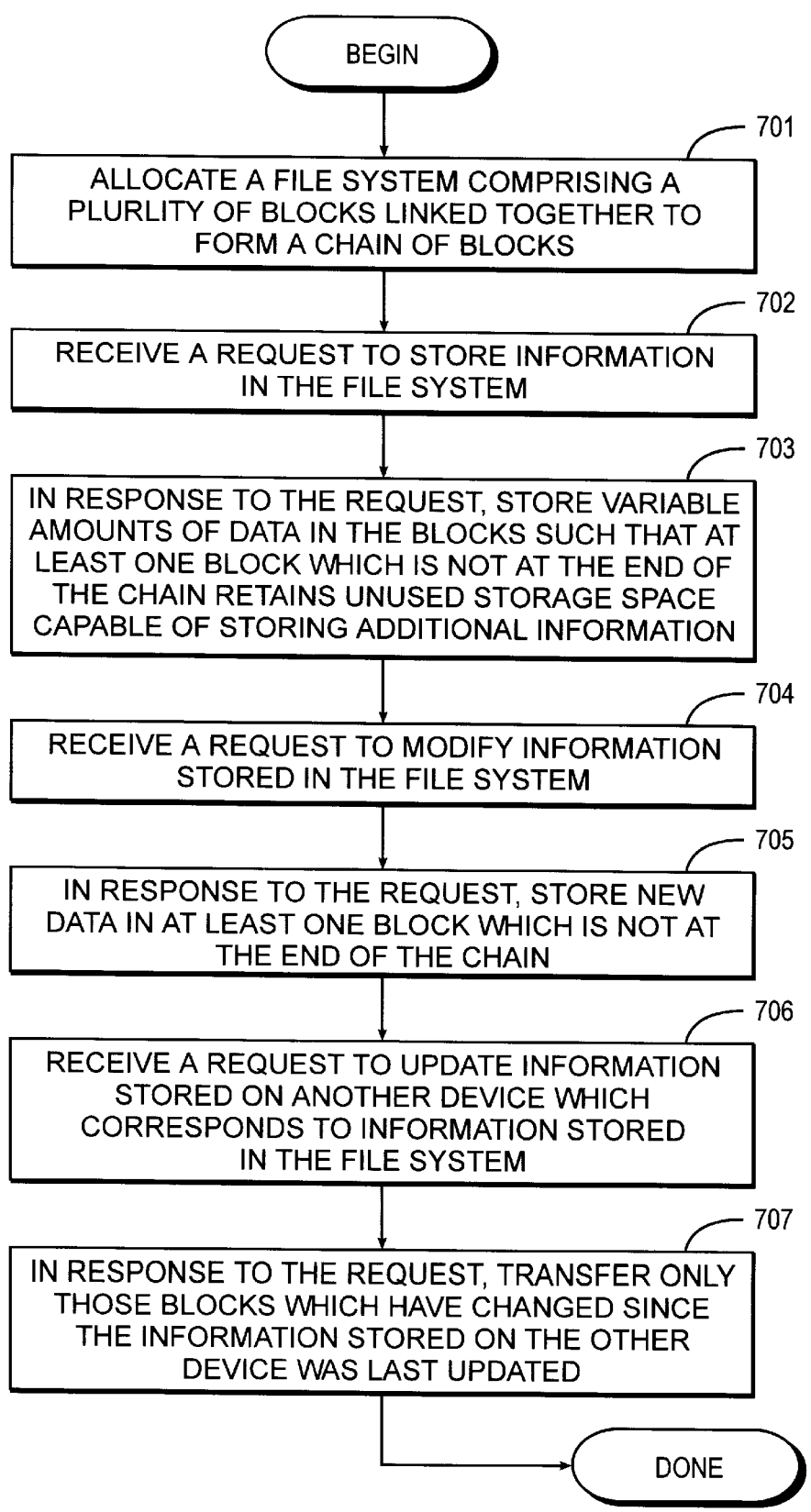
FIG. 7 is a flow chart summarizing methodology for storing and transferring information in accordance with the present invention.

FIG. 7 is a flow chart summarizing methodology 700 for storing and transferring information in accordance with the present invention. At step 701, the device allocates a file system comprising a plurality of blocks linked together to form a chain of blocks for storing information. At step 702, a request is received by the device to store information in the file system. In response to this request to store information, the device stores variable amounts of data in the blocks, at step 703, such that at least one block which is not at the end of the chain retains unused storage space capable of storing additional information. Next, at step 704, the device receives a request to modify information stored in the file system. In response to this request to modify information, the device stores new data in at least one block which is not at the end of the chain, at step 705. At step 706, the device receives a request to update information stored on another device which corresponds to information stored in the file system. In response to this request to update information stored on another device, the device transfers, at step 707, only those blocks which have changed since the information stored on the other device was last updated. As previously described, such a step would typically include a calculation of a checksum for determining which blocks have changed (e.g., as compared against a prior checksum stored in the header). Thereafter, the method is done (or continues processing other requests).

F. Advantages

The Delta Block File System or DBFS of the present invention provides an improved file system architecture for portable computing devices. By isolating typical file changes to a small area of the storage media or memory and by providing a highly-efficient, yet generic, method of detecting modifications, the present invention provides a greatly improved mechanism of transferring data between computing devices, such as when updating differences between data on a portable device and corresponding data on a host device. As an additional advantage, since a minimal number of blocks are affected by modifications, a device would need to perform fewer flash erase cycles, thus yielding potentially longer part life and better performance for the device.

While the invention is described in some detail with specific reference to a single-preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a computing device, a method for a storing and transferring data, the method comprising:

allocating a file system comprising a plurality of blocks linked together to form a chain of blocks;

receiving a request to store information in the file system;

in response to the request to store information, storing variable amounts of data in the blocks such that at least one block which is not at the end of the chain retains unused storage space capable of storing additional information;

receiving a request to modify information stored in the file system;

in response to the request to modify information, storing new data in at least one block which is not at the end of the chain;

receiving a request to update information stored on another device which corresponds to information stored in the file system; and in response to the request to update information stored on another device, transferring only those blocks which have changed since the information stored on the other device was last updated.

2. The method of claim 1, wherein said allocating step comprises:

specifying that each block comprises a header portion and a storage portion.

3. The method of claim 2, wherein said header portion of a particular block includes a signature section specifying validity for that particular block.

4. The method of claim 2, wherein said header portion of a particular block includes pointer information indicating a previous block in the chain relative to the particular block.

5. The method of claim 2, wherein said header portion of a particular block includes pointer information indicating a next block in the chain relative to the particular block.

6. The method of claim 2, wherein said header portion of a particular block includes data size information indicating how much information is actually stored by the particular block.

7. The method of claim 2, wherein said storage portion of a particular block stores a variable amount of information.

8. The method of claim 1, wherein all blocks have a uniform size.

9. The method of claim 1, said transferring step includes:

determining whether a particular block has changed by comparing a checksum for the particular block against a checksum previously computed for that particular block when the information stored on the other device was last updated.

10. The method of claim 1, further comprising:

receiving a request to modify information stored in the file system by appending an amount which exceeds storage available in a particular block which is not at the end of the chain; and in response to the request to modify information, storing new data in the particular block and storing data in a block appended to the end of the chain, such that only two blocks are affected by the request.

11. A computing system having an improved file system for storing and transferring information comprising:

a computing system having at least one processor and a memory;

a plurality of blocks allocated in the memory and linked together to form a chain of blocks for storing information;

means, responsive to a request to store information, for storing variable amounts of data in the blocks such that at least one block which is not at the end of the chain retains unused storage space capable of storing additional information;

means, responsive to a request to modify information, for storing new data in at least one block which is not at the end of the chain; and means, responsive to a request to update information stored on another device, for transferring only those blocks which have changed since the information stored on the other device was last updated.

12. The system of claim 11, wherein each block comprises a header portion and a storage portion.

13. The system of claim 12, wherein said header portion of a particular block includes a signature section specifying validity for that particular block.

14. The system of claim 12, wherein said header portion of a particular block includes pointer information indicating a previous block in the chain relative to the particular block.

15. The system of claim 12, wherein said header portion of a particular block includes pointer information indicating a next block in the chain relative to the particular block.

16. The system of claim 12, wherein said header portion of a particular block includes data size information indicating how much information is actually stored by the particular block.

17. The system of claim 12, wherein said storage portion of a particular block stores a variable amount of information.

18. The system of claim 11, wherein all blocks have a uniform size.

19. The system of claim 11, wherein said transferring means includes:

means for determining whether a particular block has changed by comparing a checksum for the particular block against a checksum previously computed for that particular block when the information stored on the other device was last updated.

20. The system of claim 11, further comprising:

means, responsive to a request to modify information by appending an amount which exceeds storage available in a particular block which is not at the end of the chain, for storing new data in the particular block and storing data in a block appended to the end of the chain, such that only two blocks are affected by the request.

* * * * *